United States Patent Office

2,778,738
Patented Jan. 22, 1957

2,778,738

PEPPER

Harold J. Fagen, Highland Park, Ill., assignor to Kraft Foods Company, Chicago, Ill., a corporation of Delaware No Drawing. Application August 31, 1954,
Serial No. 453,429

5 Claims. (Cl. 99—140)

The present invention relates generally to improvements in the preparation of a pepper solution and, more particularly, it relates to solubilizing oleoresin of pepper.

Pepper is produced from the plant *Piper nigrum* which is grown in India, the Philippine Islands, Sumatra, Java, Ceylon and Borneo. The plant is dried and comminuted for sale as pepper. However, in commercial practice, an oleoresin of pepper is often prepared by soaking the dried plant in acetone, chloroform, or other low boiling solvent, after which the solvent is distilled off at relatively low temperature leaving a residue which is oleoresin. The resulting oleoresin contains the essential oils of pepper including phellandrene and caryophyllene, and a resinous material which includes piperine, which is an alkaloid, and resinous materials.

Thus it will be seen that the oleoresin of pepper comprises two phases, a liquid phase including essential oil, and a solid phase including resin and piperine. The essential oil provides the aroma of pepper but does not provide the bite of pepper. This bite is provided by the piperine and resin which are substantially odorless.

Oleoresin of pepper has been prepared in the form of a dispersion or emulsion, but is generally marketed as a product comprising a liquid phase and a solid phase, though some is sold in the form of a paste. In the latter connection, the pepper, in finely divided form, is made into a paste. The oleoresin may also be prepared into a product known as cream of pepper when it is spread on or mixed with salt so that when the product is used in the preparation of food it can be more uniformly dispersed.

However, there has not been available any satisfactory highly concentrated pepper solution for use in the manufacture of food products, that is to say, a solution in which the resins were solubilized. While various solvents are known for essential oil and the resin-piperine material, e. g. the chloroform or acetone used in extracting oleoresin, these solvents are considered deleterious in food products. Other solvents are also known such as various organic acids like acetic acid, butyric acid, levulinic acid, and pyruvic acid. However, these solvents either provide a substantial flavor or are so expensive as to be impractical.

Various attempts have been made to solubilize oleoresin to provide a homogeneous solution but the materials previously tried either did not dissolve in oil, did not dissolve the piperine and resin, or were unsatisfactory because of their deleterious character, cost, or flavor characteristics. The use of anhydrous lactic acid has been proposed for dissolving piperine and emulsifying with oil but the presence of small amounts of water tends to break the emulsion and, from a commercial standpoint, it is practically impossible to maintain a satisfactory emulsion. When oleoresin is solubilized in vegetable oil, such as cottonseed oil, soy bean oil, etc., by the use of heat, the resin reprecipitates when the temperature is reduced to about room temperature, i. e. the temperature at which salad dressings and other foods including pepper are normally manufactured.

Therefore, the main object of the present invention is the provision of an improved process for providing a homogeneous solution of oleoresin of black pepper with a material, the material being non-deleterious, economical, and free from a characteristic flavor. This and other objects of the invention, as will become more clear hereinafter, are accomplished by mixing oleoresin of pepper with propylene glycol in an amount sufficient to dissolve the resin and piperine, and raising the temperature of the mixture to a temperature above 150° F. for a time sufficient to solubilize the resin and piperine, following which the temperature may be lowered to about room temperature without recrystallization of the resin and piperine.

In the practice of my invention, oleoresin of black pepper is made by the usual manner of extracting it from pepper corns through the use of a volatile solvent, such as acetone or chloroform. The volatile solvent is removed at low temperature so as not to lose any of the volatile oils included in the essential oil of pepper.

As previously pointed out, the oleoresin includes an oil phase comprising the essential oils of pepper and a solid phase including piperine and resin. This solid phase tends to harden on standing and, in some cases, cannot be removed from the container without heating to soften the resin. Of course, overheating of the piperine and resin has a deleterious effect upon pepper quality. Through the practice of my invention, the resin and piperine are in solution with the essential oil and the hardening of the solid phase is avoided. Accordingly, the solution can be poured at any time and, because of its homogeneous character, the essential oil, piperine and resin are poured, at all times, in the same proportion.

Th extracted oleoresin, in accordance with my invention, is mixed with propylene glycol. The ratio of piperine and resin to propylene glycol, on a weight basis, can be as high as 1 to 2, i. e. the percentage of piperine and resin can be as high as 33 percent of the solution. At higher amounts of piperine and resin, recrystallization from the solution occurs at about room temperatures. At substantially lower amounts of piperine and resin relative to the amount of propylene glycol, excessive amounts of propylene glycol are used and this is undesirable when liquid pepper is incorporated in food products.

Propylene glycol is a highly advantageous solvent because it is substantially tasteless so that it does not impart a characteristic flavor to the solution. Furthermore, it is non-deleterious so that it may be used in food products and it is relatively economical. In addition, it has a relatively high boiling point (371° F.) so that it limits the loss of the volatile oils and permits longer storage of oleoresin without substantial loss of aroma.

In order to effect solution of the resin and piperine into propylene glycol, I have found that it is necessary to heat the mixture to a temperature in excess of about 150° F. Such heating of the mixture is contrary to the teachings of the art because it was thought that at such high temperatures the aroma of the pepper is substantially reduced. It has been found that through the use of propylene glycol, the aroma is substantially maintained in the solution despite the use of such relatively high temperatures. As above pointed out, the high boiling point of propylene glycol limits the vaporization of the volatile oils. It has been found desirable to maintain the temperature for a period of time of the order of one to two hours with relatively high solids concentration in order to prevent recrystallization when the solution is cooled. In this connection, even though the piperine and resin has apparently gone into solution, recrystallization may occur unless additional heating beyond the point where apparent dissolution of solids has occurred. The time of such additional heating appears to be related to the solids concentration. At higher solids concentration, longer heating is required.

Upon cooling of the solution, the resin and piperine does not recrystallize and the solution can be used in the preparation of salad dressing and other food products, particularly where wide distribution of small amounts of pepper is desirable.

The ratio of piperine and resin to propylene glycol should not be less than 1 to 5, which is to say that the concentration of piperine should not be below about 15 percent.

In a particular example of my invention, I obtained an oleoresin of black pepper which contained about 50 percent resin and piperine and about 50 percent essential oils. I mixed the oleoresin with an equal amount of propylene glycol and heated the mixture to about 180° F. for one hour. The solution was then cooled.

The resulting solution of the invention has considerable advantage because it can be volumetrically proportioned and easily poured into the oil phase during salad dressing manufacture or at appropriate points in the manufacture of other food products. Furthermore, the pepper can be more uniformly dispersed in the finished food product so that it is possible to use lesser amounts of pepper. In addition, propylene glycol is a substantially tasteless material so that it can be used without adjustment of the formulation of the food product produced.

The various features of the invention which are believed to be new are set forth in the following claims.

I claim:

1. A process for manufacturing a pepper solution which comprises the steps of preparing an oleoresin of pepper, the oleoresin including a solid phase and a liquid phase, mixing propylene glycol with said oleoresin, heating said mixture to a temperature above about 150° F. for a time sufficient to solubilize the solid phase, and reducing the temperature.

2. A process for manufacturing a pepper solution which comprises the steps of preparing an oleoresin of pepper, the oleoresin inluding a solid phase and a liquid phase, mixing propylene glycol with said oleoresin, heating said mixture to a temperature above about 150° F. for a time in excess of that apparently required to solubilize the solid phase.

3. A process for manufacturing a pepper solution which comprises the steps of preparing an oleoresin of pepper, the oleoresin including a solid phase and a liquid phase, mixing propylene glycol with said oleoresin in an amount of at least two parts of propylene glycol for each part of solid phase, heating said mixture to a temperature above about 150° F. for a time sufficient to solubilize the solid phase, and reducing the temperature.

4. A process for manufacturing a pepper solution which comprises the steps of preparing an oleoresin of pepper, the oleoresin including a solid phase and a liquid phase, mixing propylene glycol with said oleoresin in an amount of at least two parts of propylene glycol for each part of solid phase and in an amount of less than 5 parts of propylene glycol for each part of solid phase, heating said mixture to a temperature above about 150° F. for a time sufficient to solubilize the solid phase, and reducing the temperature.

5. A stable homogeneous liquid pepper composition comprising an oleoresin of pepper and propylene glycol, the ratio of oleoresin to propylene glycol being in the range from 1:5 to 1:2.

References Cited in the file of this patent

UNITED STATES PATENTS

| | | |
|---|---|---|
| 1,384,681 | Smith et al. | July 12, 1921 |
| 2,626,218 | Johnstone et al. | Jan. 20, 1953 |
| 2,680,690 | Schumm | June 8, 1954 |